United States Patent
Liu et al.

(10) Patent No.: US 9,763,198 B2
(45) Date of Patent: Sep. 12, 2017

(54) METHOD USED FOR UPLINK POWER CONTROL IN A HETEROGENEOUS NETWORK WITH A SHARED CELL-ID

(75) Inventors: Jin Liu, Shanghai (CN); Xudong Zhu, Shanghai (CN); Matthew Baker, Kent (GB); Yubo Yang, Shanghai (CN)

(73) Assignee: Alcatel Lucent, Boulogne, Billancourt (FR)

( * ) Notice: Subject to any disclaimer, the term of this patent is extended or adjusted under 35 U.S.C. 154(b) by 67 days.

(21) Appl. No.: 14/234,820

(22) PCT Filed: Jul. 23, 2012

(86) PCT No.: PCT/IB2012/001663
§ 371 (c)(1),
(2), (4) Date: Jan. 24, 2014

(87) PCT Pub. No.: WO2013/017948
PCT Pub. Date: Feb. 7, 2013

(65) Prior Publication Data
US 2014/0171143 A1  Jun. 19, 2014

(30) Foreign Application Priority Data
Aug. 2, 2011  (CN) .......................... 2011 1 0219297

(51) Int. Cl.
*H04W 52/14* (2009.01)
(52) U.S. Cl.
CPC .................................. *H04W 52/146* (2013.01)
(58) Field of Classification Search
CPC . H04W 52/146; H04W 52/242; H04W 52/40; H04W 52/244
See application file for complete search history.

(56) References Cited

U.S. PATENT DOCUMENTS

| 6,243,591 B1 | 6/2001 | Takamura |
| 7,769,391 B2 | 8/2010 | Andersson et al. |
| (Continued) | | |

FOREIGN PATENT DOCUMENTS

| CN | 101646229 A | 2/2010 |
| CN | 102006657 A | 4/2011 |
| (Continued) | | |

OTHER PUBLICATIONS

Jacek Gora et al., "Cell-Specific Uplink Power Control for Heterogeneous Networks in LTE," Vehicular Technology Conference Fall, IEEE $72^{nd}$, 5 pages, Sep. 2010.
(Continued)

*Primary Examiner* — Bobbak Safaipour
(74) *Attorney, Agent, or Firm* — Fay Sharpe, LLP

(57) ABSTRACT

In a heterogeneous network with a shared cell-ID, the current power control mechanism only configures common power control parameters for all UE in a macro cell, and this doesn't match the receiving power of a wireless access point associated actually, and may lead to serious interferences. The invention provides a method used for uplink power control in a UE of a heterogeneous network with a shared cell-ID, wherein, a wireless access point informs the UE of power control parameters which is related to an associated wireless access point of the UE in the heterogeneous networks, the UE determines a uplink power according to the power control parameters, and transmits uplink data based on the determined uplink power. The invention may configure uplink power for the UEs associated to different wireless access points in a heterogeneous network with a shared cell-ID, to make them have the power control parameters matching with their wireless access points. Thus it's allowed that a performance equivalence between different tiers of networks in a heterogeneous network.

12 Claims, 1 Drawing Sheet

(56) References Cited

U.S. PATENT DOCUMENTS

| | | | |
|---|---|---|---|
| 8,805,398 B2 | 8/2014 | Morita et al. | |
| 8,929,881 B2 | 1/2015 | Sato et al. | |
| 8,965,443 B2* | 2/2015 | Gao | H04W 74/004 370/252 |
| 9,037,091 B2* | 5/2015 | Sun | H04W 68/08 370/329 |
| 9,100,921 B2* | 8/2015 | Xu | H04W 52/08 |
| 2003/0119452 A1 | 6/2003 | Kim et al. | |
| 2008/0081655 A1* | 4/2008 | Shin | H04W 52/08 455/522 |
| 2011/0105059 A1 | 5/2011 | Gaal et al. | |
| 2012/0142364 A1 | 6/2012 | Duan | |
| 2012/0201164 A1* | 8/2012 | Jongren | H04L 5/0048 370/252 |
| 2012/0329503 A1* | 12/2012 | Jongren | H04W 52/10 455/509 |
| 2014/0213316 A1* | 7/2014 | Liu | H04W 52/10 455/522 |

FOREIGN PATENT DOCUMENTS

| | | |
|---|---|---|
| CN | 101124745 A | 3/2013 |
| JP | 10-117166 | 5/1998 |
| JP | 2011-101313 | 5/2011 |
| JP | 2013-034113 A | 2/2013 |
| WO | WO 2010/005236 A2 | 1/2010 |
| WO | WO 2011/070733 A1 | 6/2010 |
| WO | WO 2010/129610 A2 | 11/2010 |
| WO | WO 2011/018906 A1 | 2/2011 |
| WO | WO 2011/021387 A1 | 2/2011 |
| WO | WO 2011/055555 A1 | 5/2011 |

OTHER PUBLICATIONS

International Search Report for PCT/IB2012/001663 dated Feb. 7, 2013.

Yi Ding, et al., "Performance analysis of an improved uplink power control method in LTE-A CoMP network," Broadband Network and Multimedia Technology (IC-BNMT), 2010 3$^{rd}$ IEEE International Conference, Oct. 28, 2010.

Alcatel-Lucent Shanghai Bell, "Individual Setting of UL Open-loop Power Control for Heterogeneous Networks with Shared Cell-ID," 3GPP TSG RAN WG1, Meeting #66, R1-112423, Anthens, Greece, Aug. 22-26, 2011, pp. 1-5.

Alcatel-Lucent Shanghai Bell, "Uplink Power Control Considerations for CoMP," 3GPP TSG RAN WG1, Meeting #65, R1-111433, Barcelona, Spain, May 9-13, 2011, pp. 1-3.

Ericsson, UL power control in hotzone deployments, 3GPP TSG RAN WG1 meeting #61, R1-102619, Montreal, Canada, May 10-14, 2010, pp. 1-4.

3GPP TS 136 213, Physical Layer Procedures, Release 10, V10.1.0, Apr. 2004.

3GPP TS 36.213, Physical Layer Procedures, Release 9, V9.0.1, Dec. 2009.

Intel Corporation, "Uplink Power Control Discussion for CoMP Scenario 4," 3GPP TSG-RAN WG1 #65, R1-111598, Barcelona, Spain, May 9-13, 2011, 16 pages.

* cited by examiner

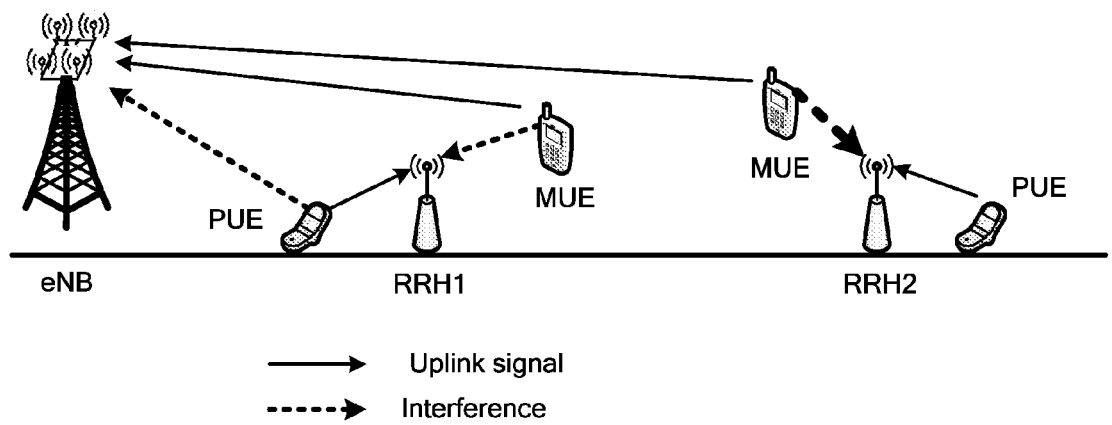

METHOD USED FOR UPLINK POWER CONTROL IN A HETEROGENEOUS NETWORK WITH A SHARED CELL-ID

TECHNICAL FIELD

The invention relates to a wireless communication technology, especially relates to a technology of uplink power control in a heterogeneous network.

BACKGROUND OF THE ARTS

Defined in 3GPP TS36.213, the uplink (UL) power control of the LTE is a combination of a open loop mechanism and a closed loop mechanism. Wherein, the open loop mechanism means that the transmit power of a user equipment (UE) is depending on an estimation of downlink (DL) path loss, while the closed loop mechanism means that the network may additionally control the transmit power of a UE directly by an explicit power control command that is transmitted in downlink. The open loop power control (OLPC) is mainly responsible for a rough adjustment of the transmit power of a UE, and it mainly compensates the slow change of path loss to obtain a certain average received signal power for all UE. While the closed loop power control (CLPC) is mainly used for a UE-specific adjustment of the power configuration, it can eliminate the influence of quick change of channels, and match or be as close as possible the receiving SINR to further optimize the overall network performance.

According to the quantity of resource blocks scheduled for PUSCH transmission, the transmission power (i.e. uplink power) in each subframe is deduced from a semi-static operation point and a dynamic bias. In 3GPP, the power control formula of PUSCH transmission is defined by the following expression:

$$P_T = \min\{P_{max}, 10 \cdot \log_{10}(M) + P_0 + \alpha \cdot PL_{DL} + \Delta_{MCS} + \delta\} \quad (1)$$

Wherein, $P_T$ is the transmit power of a given subframe, $P_{max}$ is the allowed maximum transmit power of the UE, e.g. 23 dBm, M is the bandwidth of PUSCH measured by the quantity of physical resource blocks (PRB), $PL_{DL}$ is the downlink path loss measured by the UE.

And, wherein, $P_0$ is a semi-static basic level, $\alpha$ is a compensation factor of open loop path loss, which depends on many factors including inter-cell interferences and cell loads.

Besides, $\Delta_{MCS}$ is a component related to modulating coding scheme (MCS), and it reflects the fact that different modulation schemes and coding rates need different SINRs. $\delta$ is a UE-specific adjustment value which is indicated by an explicit TPC command, and it's a UE-specific CLPC corrective value at a semi-static operation point.

The above introduces the power control schemes in 3GPP. The following describes co-channel interferences in a heterogeneous network, and introduces shortcomings existed in current technology.

As shown in FIG. 1, there are two cases where serious UL co-channel interference may occur in heterogeneous networks. First, at an edge of a macro cell, a macro-UE (MUE) transmits with a high power to an eNB in order to overcome large path loss between the MUE and the eNB. In this case, if an Pico eNB (or RRH) RRH2 locates at the edge of the macro-cell, a pico-UE (PUE) associated with RRH2 suffers from a serious interference of MUE which transmit UL signals with the high power. On the other hand, in the case that an RRH locates close to a macro-eNB, such as RRH1, the UL signals transmitted by a PUE associated with RRH1 may become a serious interference to MUE which transmit UL signals to the macro eNB.

In order to coordinate the co-channel interferences in the above different cases, the UL power controls of UEs associated with different RRHs should have different design targets. E.g., for the RRH locating at the edge of a cell, the UE associated with them should use higher transmit power to overcome the interference from a MUE. In another example, for the RRH near macro-eNB, the UE associated with them should use lower transmit power to avoid serious interference to a MUE. Thus, the adaptive adjustment of power control is favorable, such as adjustment depending on the location of a RRH relative to a macro-eNB. (J. Gora, K. I. Pedersen, A. Szufarska and S. Strzyz, "Cell-specific uplink power control for heterogeneous networks in LTE", IEEE VTC2010-Fall, Canada Ottawa, September 2010)

For UL CoMP, due to the coordinated processing among different reception points, the conventional power control parameters need to be modified to take the specific UL CoMP algorithms into account. Especially in the scenarios that the cooperation areas of UL CoMP are different for different UEs, the conventional OLPC parameters need to be reconsidered to fully utilize the CoMP gains.

Based on the above analysis, the common configuration of transmit power is suboptimal in heterogeneous networks, especially for CoMP. The transmit power can be adjusted to achieve better macro-cell performance at the cost of performance at pico-cells and vice versa. An appropriate configuration of transmit power may be selected according to an equivalence between performances of the cells of the two tiers.

In the current agreement, scenario 4 is one of important scenarios to be investigated. Scenario 4 is a heterogeneous network with low power RRHs within the macro-cell coverage, wherein, the transmission/reception points created by the RRHs have the same cell IDs as that of the macro-eNB.

With the current UL power control methodology as defined in 3GPP, it can not realize respective configuration of power control parameters for the UEs associated with different RRHs and the macro-eNB, since the base level $P_0$ and the path-loss compensation factor $\alpha$ are cell-specific parameters and broadcasted by the RRC signaling. It means that all UEs within the macro-cell coverage share a common configuration of power control parameters regardless of different points to which they are actually associated with. Therefore, the performance of the two tier networks in this type of heterogeneous network deployment is not optimized, due to the serious influences potentially caused by the above mismatch configurations of power control.

In addition, it is obvious that the coordinated processing can not achieve full UL CoMP gains in heterogeneous networks with shared cell-ID since it doesn't differentiate the power settings for CoMP UEs and non-CoMP UEs.

SUMMARY OF THE INVENTION

The main purpose of the invention is to solve the technical problem that the power control parameters of each UE can't be configured respectively. The invention will propose several method of configuring power control parameters, e.g. configuring power control parameters for UEs at different locations in heterogeneous networks with shared cell-ID to realize the equivalence between performances of the two tier networks.

According to an aspect of the invention, a method is provided, which is used for uplink power control in a UE of a heterogeneous network with a shared cell-ID, wherein, the method comprises the following steps:

i. Receiving power control parameters, which is related to an associated wireless access point of the UE in the heterogeneous networks.

ii. Determining a uplink power according to the power control parameters;

iii. Transmitting uplink data based on the determined uplink power.

According to this aspect, the power control parameters of a wireless access point associated with the UE may be provided to the UE, thus the UEs located at different positions (i.e. associated to different wireless access points) in a heterogeneous network with a shared cell-ID are configured with UL powers, to make the UE have the power control parameters matched with their locations. Therefore the performance equivalence between of different network tiers respectively administered by eNB and RRH is allowed in heterogeneous networks. Preferably, the optimal performance may be obtained in RRH, and not interfere the performance of a macro cell.

According to a preferable embodiment, the step i comprises the following steps:

a. Receiving at least two groups of power control parameters broadcasted by the wireless access point, the at least two groups of power control parameters are respectively related to different associatable wireless access points;

b. Determining to use one of the at least two groups of power control parameters;

Or, the step i comprises the following steps:

a. Receiving a first component of the power control parameters, broadcasted by wireless access point, which is related to a macro cell of the heterogeneous network, and at least two groups of second components of the power control parameters broadcasted by the wireless access point, which are respectively related to different associatable wireless access points;

b. Determining one of the at least two groups of the second components related to the associatable wireless access points, and combining the determined group with the first component of the power control parameters, which is related to the macro cell of the heterogeneous network, into the power control parameters to be used.

The embodiment proposes a method that a wireless point broadcasts a plurality of sets of optional parameters, and a UE selects one of parameters actively or passively. The merit of the method is to save or spare the UE-specific information to inform the parameters to be used by the UE.

According to another preferable embodiment, the step i comprises the following steps:

a. Receiving a value related to the power control parameters, transmitted in a UE specific signaling by the wireless access point, the value is related to the associated wireless access point;

b. calculating the power control parameters by using a predetermined function based on the value related to the power control parameters.

The merit of the preferable embodiment is to reduce the overhead of the system information and only uses a few UE-specific signaling.

According to another preferable embodiment, the step i comprises:

a. Receiving the power control parameters transmitted in a UE specific signaling.

The merit of the embodiment is to reduce the overhead of the system information

According to another preferable embodiment, the power control parameters comprise a semi-static base level, and a compensation factor of open loop path loss, in the step i the modes of receiving the semi-static base level and the compensation factor of open loop path loss are different.

The merit of the embodiment is that, according to the power control parameters actually needed to be provided, it may be provided by using suitable mode via a principle of save signaling overhead etc. which further provide flexibility for the invention.

According to another preferable embodiment, when the UE communicates with the associated wireless access point, the power control parameters is for controlling interferences to other networks in the heterogeneous network, and/or controlling effects due to interferences from other networks in the heterogeneous network.

Correspondingly, according to the second aspect of the invention, a method used for uplink power control of a UE is provided, in a wireless access point of a heterogeneous network with a shared cell-ID, wherein, the method informs power control parameters to the UE, the power control parameters are related to an associated wireless access point of the UE in heterogeneous network.

BRIEF DESCRIPTION OF DRAWINGS

The above and other features, purpose and merits will be more obvious, by reading the detailed description to the unlimited embodiment referred to the following drawings:

FIG. 1 shows two kinds of interferences which may exist in a heterogeneous network.

In the drawings, the same or similar reference signs represent the same or similar components.

DETAILED DESCRIPTION OF EMBODIMENTS

First, the following describes several types of associations between the power control parameters and wireless access points.

Type 1 The power control parameters are different for the macro wireless access point and the micro wireless access point.

Subtype 1 The power control parameters are the same for each micro eNB.

The subtype may be set in such a case: RRHs have the same or similar interference features, e.g. all located indoors and all signals suffering from a serious penetration loss. Thus, the UEs in the vicinity of RRH may increase transmit power without causing interference to the UL signals of UE which are associated with the macro wireless access point. Therefore, a first set of power control parameters can be determined for the UE associated to the macro wireless access point, and a second set of power control parameters can be determined for the UE associated to RRH.

Subtype 2 The power control parameters are the same for all indoor RRHs or the same for all outdoor RHHs.

This subtype is a further consideration of the above subtype 1. Considering some RRHs deployed outdoors, their signals are not affected by penetration loss. So, a first set of power control parameters can be determined for the UE associated to the macro wireless access point, a second set of power control parameters can be determined for the UE associated to indoor deployed RRH, and a third set of power control parameters can be determined for the UE associated to outdoor deployed RRH.

Type 2 The semi-static base level $P_0$ is different for each micro wireless access point, and the path loss compensation factor $\alpha$ is the same for all micro wireless access points.

In one case, the uplink interference level measured at a RRH depends on the location of the RRH, i.e. it varies according to the distance with a macro wireless access point. Then preferably, the semi-static base level $P_0$ may vary according to the location of a RRH, e.g. the path loss of a RRH with a macro wireless access point. E.g. the farther the RRH to which a certain micro UE is associated is from a macro eNB, the more serious uplink interference generated by a macro UE it may suffer, so the semi-static base level $P_0$ used by the micro UE should be bigger and vice versa.

Type 3 The semi-static base level $P_0$ and the path loss compensation factor $\alpha$ are different for each micro wireless access point.

The type has more flexibility, similar with the flexibility of power control obtained in a heterogeneous network allowing different cell-IDs. But this type potentially needs more signaling overhead.

The above several types of associations are only examples. After the description of the several types of associations, the following firstly describes the first embodiment of the invention.

In this embodiment, at least two groups of power control parameters are broadcasted to a UE by a wireless access point, and the at least two groups of power control parameters are respectively related to different associatable wireless access points. Each UE selects and use one of the at least two groups of power control parameters.

As to how to select, in one case, the UE may receive an indication of the one of the at least two groups of the power control parameters which is transmitted in a UE-specific signaling by the wireless access point. In detail, a wireless access point (a macro wireless access point or a micro wireless access point) may inform a UE to use which group in an extra UE-specific signaling: e.g. if two groups of power control parameters are broadcasted in a cell, one bit in the UE signaling may be used for indicating which group to use.

In another case, the UE selects one of the at least two groups of the power control parameters, according to a predetermined rule based on wireless measurement results.

In detail, the wireless measurement results may be:

The signal strength, SNR or SINR of any reference signal, such as any set of CSI-RS that a UE is configured to measure (e.g. the set of CSI-RS corresponding to each RRH). When the measurement results are greater than a predetermined threshold, the UE selects a certain set of power control parameters, otherwise the UE selects another set. Wherein, the predetermined threshold may be informed to the UE by the signaling from a wireless access point.

The differences of signal strengths, SNRs or SINRs of a given reference signal (e.g. the CRS corresponding to a macro wireless access point) with another reference signal (e.g. the CRS corresponding to a RRH). When the differences are greater than a predetermined threshold, the UE selects a certain set of power control parameters, otherwise the UE selects another set.

The differences of path losses of a given reference signal (e.g. the CRS corresponding to a macro wireless access point) with another reference signal (e.g. the CRS corresponding to a RRH). When the difference is greater than predetermined threshold, the UE selects a certain set of power control parameters, otherwise the UE selects another set. In this case, the transmit power level of the reference signal to be measured should also be informed to the UE.

In some embodiments, each group of power control parameters may comprise a single parameter, such as the path loss compensation factor $\alpha$, or the semi-static base level $P_0$. In other cases, each group of parameters may comprise both of the two parameters, and/or other power control parameters.

More specifically, for a macro cell, the semi-static base level $P_0$ and the path loss compensation factor $\alpha$ of a macro cell may be informed to the UE via the current broadcast solution. And, the UE located near RRH1 (i.e. associated with RRH1) may use the power control parameters $\{P_{0\_1}, \alpha_{\_1}\}$, the UE located near RRH2 (i.e. associated with RRH2) may use the power control parameters $\{P_{0\_2}, \alpha_{\_2}\}$, and so on.

The embodiment has the following features respectively when combined with the above three types to use:

For the type 1, since the RRHs use the same power control parameters, or the indoors RRHs or outdoors RRHs use the same power control parameters respectively, actually, only one or two groups of power control parameters are needed to add in the system information, thus the extra overhead is less.

For the type 2, the added system information is comprised of one extra path loss compensation factor $\alpha$ shared by all RRH and a plurality of semi-static base levels $P_0$ used in each RRH respectively.

For the type 3, the added system information is comprised of a plurality of extra path loss compensation factors $\alpha$ used in each RRH respectively and a plurality of semi-static base level $P_0$. This potentially poses a certain degree of overhead problem onto the networks.

In a varied embodiment, a first component of the power control parameters, which is related to a macro cell of the heterogeneous network, and at least two groups of second components of the power control parameters, which are respectively related to different associatable RRHs, are broadcasted by wireless access point to the UE. And, in one case, an indication of the one of the at least two groups of the second components is transmitted to the UE in the UE-specific signaling by the wireless access point; in another case, the UE selects one of the at least two groups of the second components, according to a predetermined rule based on wireless measurement results. Later, the UE combines the first component and the second component, indicated by the wireless access point or selected by the UE, into the power control parameters to be used. The varied embodiment is essentially similar with the above first embodiment, and we will not go further on this topic.

The following describes the second embodiment of the invention.

In the embodiment, the power control parameters of all RRH are designed to be a function of one certain or a plurality of certain values related to the power parameters. E.g. in "Cell-specific uplink power control for heterogeneous networks in LTE", J. Gora, K. I. Pedersen, A. Szufarska and S. Strzyz, the semi-static base level $P_0$ of a UE in the vicinity of a RRH is designed to be a function of a path loss $PL_{RRH-eNB}$ from the RRH to a macro wireless access point:

$$P_0 = \text{round}(a + b \cdot PL_{RRH-eNB}) \qquad (2)$$

Wherein, the parameters a and b are specified by operators or vendors, thus they are the same for all RRHs, and they may be broadcasted to all UE via high level signaling. The value of $PL_{RRH-eNB}$ varies depending on the location of a RRH, and it may be transmitted to a UE via a UE-specific signaling from by a macro wireless access point or a micro wireless access point. Then, based on the value of $PL_{RRH-eNB}$, the UE uses a function such as that defined by expression (2) to calculate the semi-static base level $P_0$ which should be used. It may be understood that the semi-static base level $P_0$ may also be defined as a function of other relative values; and the path loss compensation factor α also may be defined as a function of relative values, and we will not go further on this topic.

Considering the above several types of association between the power control parameters and wireless access points, this embodiment is more suitable for the case of the type 2 and type 3 which have a plurality of semi-static base levels $P_0$ and path loss compensation factors α.

Compared to the first embodiment, the second embodiment reduces the overhead of system information, and only adds limited overhead of high level UE-specific signaling.

The following describe the third embodiment of the invention.

In this embodiment, a wireless access point (a macro wireless access point or a micro wireless access point) transmits the power control parameters to a UE via the UE-specific signaling.

In one case, the power control parameters may be wrote as the format of $\{P_0 + \Delta P_{0\_i}, \alpha + \Delta \alpha_{\_i}\}$, i ∈ (1, 2, ... n), wherein, $P_0$ and α are the common components used in a macro wireless access point, and $\{\Delta P_{0\_i}, \Delta \alpha_{\_i}\}$ are the components used in each RRH respectively.

Then preferably, a wireless access point transmits the RRH components $\{\Delta P_{0\_i}, \Delta \alpha_{\_i}\}$ associated with a UE to the UE via the UE-specific signaling.

And, a wireless access point broadcasts the components $P_0$ and α of the power control parameters to the UE, which is related to a macro cell.

A UE combines the components $P_0$ and α related to a macro cell and the components $\{\Delta P_{0\_i}, \Delta \alpha_{\_i}\}$ related to an associated RRH into the uplink power control parameters.

This embodiment reduces the overhead load of system information. Since $\{\Delta P_{0\_i}, \Delta \alpha_{\_i}\}$ are UE specific parameters, considering the above several types of association between the power control parameters and wireless access points, this embodiment has the same high level signaling overhead.

Compared to the second embodiment, this embodiment has the same degree of UE-specific signaling overhead for the type 2, and has double for the type 3.

It's worth noting that, in 3GPP R8, there exists a UE-specific correction component. However, it is used for correcting the system error in a UE power configuration, which is not related to the associated wireless access point of the UE, and its range can't cover the power configuration differences of the UE in each RRH and the macro eNB. Whereas, when the UE communicates with the associated wireless access point, the power control parameters of the invention are used for controlling interferences to other networks in the heterogeneous network, and/or controlling influence due to interferences from other networks in the heterogeneous network.

The above describes three embodiments of the invention, it's worth noting that, each of power control parameters, such as the semi-static base level $P_0$ and the path loss compensation factor α, may be controlled by using the same or different solutions in the above three embodiments and other embodiments within the scope of the claims of the invention. E.g. the semi-static base level $P_0$ is controlled by the first embodiment, and at the same time, the path loss compensation factor α is controlled by the second or third embodiment.

After determining the power control parameters, such as the semi-static base level $P_0$ and the path loss compensation factor α, the UE determines the uplink power according to the power control parameters. In detail, the UE may further obtain the closed-loop power control parameters, e.g. $\Delta_{MCS}$, δ etc. and calculate an actual transmitting power $P_T$ according to the above expression (1).

After calculating the actual transmitting power $P_T$, the UE transmits the uplink data based on the determined transmitting power $P_T$.

It needs to explain that, the above embodiments are only exemplary, instead of limiting the invention. Any technical solution not deviated from the spirit of the invention should fall within the range of the invention, it comprises that different technical features occurred in different embodiments and scheduling methods may be combined to obtain beneficial effects. Besides, any reference sign in the claims should not be considered as a limitation to the related claims; the word "comprises" doesn't exclude the equipments or steps unlisted in the claims or specification; the "one" before an equipment doesn't exclude multiple existence of such equipments.

What is claimed is:

1. A method used for uplink power control in a User Equipment UE of a heterogeneous network with a shared cell-ID, wherein, the method comprises:
   receiving at least two groups of power control parameters comprising at least a semi-static base level and a compensation factor of open loop path loss, the at least two groups of power control parameters being respectively related to different associable wireless access points, wherein the power control parameters meet the following conditions:
      the power control parameters are different for a macro wireless access point and a pico wireless access point, and:
      are the same for each pico wireless access point;
      are the same for each indoor wireless access point or each outdoor wireless access point; or,
      are different for each pico wireless access point;
   wherein when the at least two groups of power control parameters are different for each pico wireless access point, the at least two groups of power control parameters meet the following conditions:
      the semi-static base levels are different for different pico wireless access points and the compensation factors of open loop path loss are the same for each pico wireless access point; or
      the semi-static base levels are different for different pico wireless access points the compensation factors of open loop path loss are different for each pico wireless access point;
   determining an uplink power according to the at least two groups of power control parameters; and
   transmitting uplink data based on the determined uplink power.

2. A method of claim 1, wherein, receiving at least two groups of power control parameters comprises:
   receiving at least two groups of power control parameters broadcasted by a wireless access point, the at least two groups of power control parameters are respectively related to different associable wireless access points;
   determining to use one of the at least two groups of power control parameters; or the receiving at least two groups of power control parameters comprises:
receiving a first component of the power control parameters, broadcasted by the wireless access point, which is related to a macro cell, and at least two groups of second components of the power control parameters broadcasted by the wireless access point, which are respectively related to different associable wireless access points;
determining one of the at least two groups of the second components related to the associable wireless access points, and combining the determined group with the first component of the power control parameters, which is related to the macro cell, into the power control parameters to be used.

3. A method of claim 2, wherein, the determining to use comprises any of the following:
receiving an indication of the one of the at least two groups of the power control parameters or second components of the power control parameters, which is transmitted in a UE specific signaling by the wireless access point;
selecting one of the at least two groups of the power control parameters or the second component of the power control parameters, according to a predetermined rule based on wireless measurement results, the wireless measurement results comprise at least any one of the following:
a signal strength, SNR or SINR of a given reference signal;
difference of signal strengths, SNRs or SINRs of two given reference signals;
difference of path losses of two given reference signals.

4. A method of claim 1, wherein, receiving at least two groups of power control parameters, which are related to an associated reference signal to the UE comprises:
receiving a value related to the at least two groups of power control parameters, transmitted in a UE specific signaling by the wireless access point, the value is related to the associated wireless access point;
calculating the at least two groups of power control parameters by using a predetermined function based on the value related to the power control parameters.

5. A method of claim 1, wherein, receiving at least two groups of power control parameters, which are related to an associated reference signal to the UE comprises:
receiving the at least two groups of power control parameters transmitted in a UE specific signaling.

6. A method of claim 5, wherein, the receiving a value comprises:
receiving a component of the at least two groups of power control parameters related to the associated wireless access point, transmitted in a UE specific signaling;
the receiving at least two groups of power control parameters, which are related to an associated reference signal to the UE comprises:
receiving a component of the at least two groups of power control parameters, which is broadcasted, related to the macro cell; and
combining the component related to the macro cell with the component related to the associated wireless access point into the power control parameters.

7. A method of claim 1, wherein, the at least two groups of power control parameters comprise a semi-static base level, and a compensation factor of open loop path loss, the way of receiving the semi-static base level and the open loop path loss in the receiving can be the same or different; or when the UE communicates with the associated wireless access point, the at least two groups of power control parameters are for controlling interferences to other networks, or controlling effects due to interferences from other networks.

8. A method used for uplink power control of a User Equipment UE, in a wireless access point of a heterogeneous network with a shared cell-ID, wherein, the method informs at least two groups of power control parameters to the UE, the at least two groups of power control parameters being respectively related to different associable wireless access points, wherein, the at least two groups of power control parameters meet the following conditions:
the at least two groups of power control parameters are different for a macro wireless access point and a pico wireless access point, and:
are the same for each pico wireless access point;
are the same for each indoor wireless access point or each outdoor wireless access point; or
are different for each pico wireless access point;
the at least two groups of power control parameters comprise a semi-static base level, and a compensation factor of open loop path loss, when the at least two groups of power control parameters are different for each pico wireless access point, the at least two groups of power control parameters meet the following conditions:
the semi-static base levels are different for different pico wireless access points and the compensation factors of open loop path loss are the same for each pico wireless access point; or
the semi-static base level are different for different pico wireless access points and the compensation factors of open loop path loss are different for each pico wireless access point.

9. A method of claim 8, wherein, the method comprises:
broadcasting at least two groups of power control parameters to the UE, the at least two groups of power control parameters are respectively related to different associable wireless access points;
or,
broadcasting a first component of the power control parameters, which is related to a macro cell, and at least two groups of second components of the power control parameters, which are respectively related to different associable wireless access points, to the UE.

10. A method of claim 9, wherein, the method comprises:
transmitting an indication of the one of the at least two groups of power control parameters or second components of power control parameters, in a UE specific signaling, to the UE.

11. A method of claim 8, wherein, the method comprises:
transmitting a value related to the at least two groups of power control parameters in a UE specific signaling, to the UE;
or, the method comprises:
transmitting a component of the at least two groups of power control parameters related to the associated wireless access point, in a UE specific signaling, to the UE;
broadcasting a component of at least two groups of power control parameters, which is related to a macro cell, to the UE, the component related to the macro cell and the component related to the associated wireless access point are for being combined into the power control parameters.

12. A method of claim 8, wherein, the at least two groups of power control parameters comprise a semi-static base level, and a compensation factor of open loop path loss, the way of informing the semi-static base level and the open loop path loss can be the same or different; or when the UE communicates with the associated wireless access point, the at least two groups of power control parameters is for controlling interferences to other networks, or controlling effects due to interferences from other networks.

\* \* \* \* \*